United States Patent [19]

Sato et al.

[11] 4,392,396
[45] Jul. 12, 1983

[54] FINAL DRIVE ASSEMBLY FOR VEHICLES

[75] Inventors: Yoshito Sato, Hirakata; Tomoyuki Takahashi, Yawata, both of Japan

[73] Assignee: Kabushiki Kaisha Komatsu Seisakusho, Tokyo, Japan

[21] Appl. No.: 185,137

[22] Filed: Sep. 8, 1980

[30] Foreign Application Priority Data

Sep. 11, 1979 [JP] Japan .................... 54-124623[U]

[51] Int. Cl.³ .................... F16H 3/44; F16H 1/28
[52] U.S. Cl. .................... 74/785; 74/411; 74/801; 74/797
[58] Field of Search .............. 74/785, 788, 801, 411, 74/797

[56] References Cited

U.S. PATENT DOCUMENTS

| | | | |
|---|---|---|---|
| 2,759,376 | 8/1956 | Chamberlin et al. | 74/801 |
| 2,926,550 | 3/1960 | Stoeckicht | 74/785 |
| 2,939,346 | 7/1960 | McCarthy et al. | 74/801 |
| 2,956,451 | 10/1960 | Bowman | 74/411 |
| 3,021,731 | 2/1962 | Stoeckicht | 74/411 |
| 3,150,532 | 9/1964 | Bixby | 74/801 |
| 3,293,948 | 12/1966 | Jarchow et al. | 74/801 |
| 3,424,035 | 1/1969 | Heidrich | 74/801 |
| 3,518,897 | 7/1970 | Bixby | 74/801 X |
| 3,854,349 | 12/1974 | Michling | 74/411 |
| 4,062,252 | 12/1977 | Matikainen | 74/411 |
| 4,098,140 | 7/1978 | Strohschein | 74/411 |
| 4,132,134 | 1/1979 | Avery et al. | 74/801 |
| 4,237,750 | 12/1980 | Takahashi | 74/801 |

Primary Examiner—Leslie A. Braun
Assistant Examiner—Lawrence J. Gotts
Attorney, Agent, or Firm—Armstrong, Nikaido, Marmelstein & Kubovcik

[57] ABSTRACT

A final drive assembly for a vehicle comprising a housing, an input pinion gear rotatably supported by the housing, a sun gear shaft rotatably supported by the housing, a final drive bull gear fixedly secured to the sun gear shaft and in mesh with the input pinion gear, a planetary reduction gear group with a carrier thereof being rotatably mounted on the sun gear shaft, a sprocket rotatably mounted on the housing, and a torque tube fixedly secured to the sprocket and mounted for rotation on the sun gear shaft, the torque tube being coupled with the carrier.

2 Claims, 1 Drawing Figure

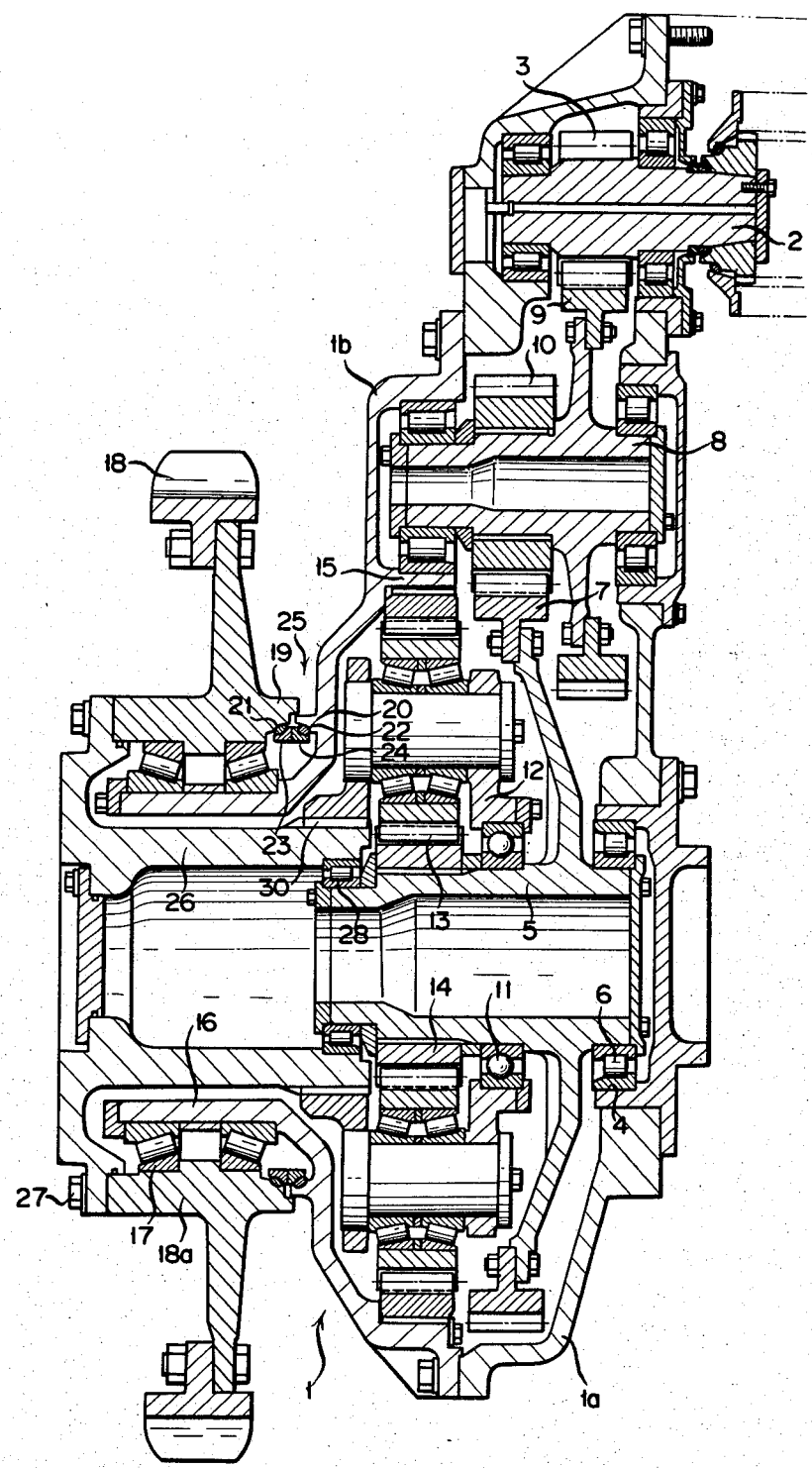

FINAL DRIVE ASSEMBLY FOR VEHICLES

BACKGROUND OF THE INVENTION

This invention relates to a final drive assembly for crawler vehicles, and more particularly to a final drive assembly having a planetary gear transmission system at its final stage and which can provide output from the carrier.

There have heretofore been known a great many final drive assemblies of the kind specified, some of which have a planetary gear transmission system at the final stage thereof. The type of planetary gear transmission system is sun-gear input, fixed ring gear and carrier output.

These final drive assemblies are, however, disadvantageous in that since the carrier and the track-chain-driving sprocket (hereinafter referred to simply as sprocket) are secured almost rigidly by means of tapered serrations or bolts, the carrier must rotate together with the sprocket on the same axis and the external force and the tractive reaction force become so large as to cause a deformation of a housing carrying the sprocket, and when the sprocket axis deviates from its normal axis by any reason or due to a working error, there will occur a deviation of the axis of the carrier which is normally the same as that of the carrier.

In such prior art device, when the carrier deviates from the axis of the planetary gear transmission system beyond a certain value, the load distribution on individual planet gears will become uneven to some degree thereby impairing the durability of the planetary gear transmission system itself.

SUMMARY OF THE INVENTION

It is therefore an object of the present invention to provide a final drive assembly for a vehicle which can overcome the above noted problems.

Another object of the present invention is to provide a final drive assembly including a planetary gear transmission wherein durability of the planetary gear transmission is significantly improved by coupling a carrier of the transmission with a sprocket in such a manner as to allow slight play in a circumferential direction therebetween.

In accordance with an aspect of the present invention, there is provided a final drive assembly for a vehicle, comprising: a housing; an input pinion gear rotatably supported by said housing; a sun gear shaft rotatably supported by said housing; a final drive gear fixedly mounted on said sun gear shaft, said final drive gear being in mesh with said input pinion gear; a planetary reduction gear group having a sun gear, a plurality of planet gears, a carrier and a ring gear, said sun gear being fixedly mounted on said sun gear shaft, said ring gear being fixedly mounted on said housing, said planet gears being rotatably mounted on said carrier, said carrier being rotatably mounted on said sun gear shaft; a sprocket rotatably mounted on said housing; torque tube means fixedly secured to said sprocket and rotatably mounted on said sun gear shaft; and means for coupling said torque tube means with said carrier in such a manner as to allow slight play in circumferential direction therebetween.

The above and other objects, features and advantages of the present invention will be readily apparent from the following description taken in conjunction with the accompanying drawing.

BRIEF DESCRIPTION OF THE DRAWING

FIG. 1 is a longitudinal cross-sectional view of a final drive assembly for a vehicle according to the present invention.

DESCRIPTION OF THE PREFERRED EMBODIMENT

The present invention will now be described below by way of example only with reference to the accompanying drawing.

Reference numeral 1 denotes a housing structure comprised of an inner casing 1a and an outer casing 1b. Rotatably supported in the inner casing 1a is an input shaft 2 having a gear 3 formed thereon.

Further, rotatably carried by a bearing 6 mounted in a bearing seat 4 of the inner casing 1a is a sun gear shaft 5 provided with a final drive bull gear 7.

Moreover, rotatably supported by bearing seat portions of the inner casing 1a and the outer casing 1b is an intermediate shaft having gears 9 and 10, the gear 9 meshing with the gear 3 of the input shaft 2 and the gear 10 meshing with the bull gear 7 of the sun gear shaft 5.

Mounted on the sun gear shaft 5 through a ball bearing 11 is a carrier 12 having a plurality of planet gears 13 rotatably carried thereby. A sun gear 14 is connected to the sun gear shaft 5 by splines formed on both components, said sun gear 14 meshing with the plurality of planet gears 13. Further, the planet gears 13 mesh with a ring gear 15 provided in the outer casing 1b. The outer casing 1b has a bearing seat portion 16 which is coaxial with the sun gear shaft 5 and which has a sprocket 18 mounted thereon through a bearing 17.

Formed on one side of the sprocket 18 is a retainer 19, whilst formed on the outer casing 1b is a retainer 20, the retainers 19 and 20 having seal rings 23 and 24, mounted thereon, respectively, through "O" rings 21 and 22, thus forming a floating seal arrangement 25.

Inserted inside the aforementioned bearing seat portion 16 is a torque tube 26 which is located coaxially with the sun gear shaft 5. One end of the torque tube 26 is rotatably supported through a bearing 28 by the sun gear shaft 5, and the outer end of which is fixedly secured to the sprocket 18 by means of bolts 27.

The torque tube 26 is connected to the aforementioned carrier 12 by the engagement of splines 30 formed thereon.

The operation of the final drive assembly of the present invention will now be described below. The power supplied to the input shaft 2 is transmitted through the gears 3, 9, the intermediate shaft 8, the gears 10, 7, the sun gear shaft 5, the sun gear 14, the planet gears 13, the carrier 12 to the torque tube 26 thereby to rotate the sprocket 18.

When an external force or a tractive reaction force is applied to the sprocket 18, these forces are exerted through the bearing 17 on the bearing seat portion 16 so that the outer casing 1b is subjected to these loads. The outer casing 1b has a sufficient strength to endure such external forces, but a deflection of the outer casing 1b is unavoidable.

Although shaft portion 18a of the sprocket 18 will deviate from the original axis thereof due to the above deflection, such deviation is not directly transmitted to the carrier 12 by the action of the splines 30 formed in the coupling portions of the torque tube 26 to which the shaft portion 18a is connected and the carrier 12.

Because of the floating connection of the carrier 12 to the shaft portion 18a of the sprocket 18, the carrier 12 is movable axially, but such axial movement is restricted by the ball bearing 11 disposed between the carrier 12 and the sun gear shaft 5.

As described in detail hereinabove, the present invention is characterized by comprising a housing 1, an input shaft 2, a sun gear shaft 5 which is rotatably supported within the housing 1 so as to be subject to the power transmitted from the input shaft 2 through a gear train, said sun gear shaft 5 having a sun gear 13 fixedly secured thereto and also having a carrier 12 mounted thereon through a bearing 11, said carrier 12 having a plurality of planet gears supported thereby so as to mesh with the sun gear 13 and a ring gear 15 formed in the housing 1, said housing 1 having a bearing seat portion 16 located coaxially with the sun gear shaft 5, a sprocket 18 rotatably mounted on the bearing seat portion 16, and a torque tube 26 disposed coaxially with the sun gear shaft 5, one end of said torque tube 26 being rotatably carried by said sun gear shaft 5 and the other end of which is connected to the sprocket 18, said carrier 12 being connected to the outer periphery of the torque tube 26 by a coupling means which is axially movable and which has a slight circumferential play.

Accordingly, when an external force is applied to the sprocket 18, the torque tube 26 will deviate from the original axis, however, the deviation will be taken up or absorbed by the coupling means connecting the torque tube 26 and the carrier 12 so that the deviation will give no influence on the carrier 12. Therefore, there is no occurrence of deviation in the planetary gear transmission system as well as no generation of uneven load distribution on individual planet gears and so there is no possibility of impairing the durability of the planetary gear transmission system itself.

It is to be understood that the foregoing description is merely illustrative of a preferred embodiment of the invention, and that the scope of the invention is not to be limited thereto, but is to be determined by the scope of the appended claims.

What we claim is:

1. A final drive assembly for a vehicle, comprising:

a housing;

an input pinion gear rotatably supported by said housing;

a hollow sun gear shaft rotatably supported by said housing, said hollow sun gear shaft having an open center portion;

a final drive gear fixedly mounted on said sun gear shaft;

an intermediate gear shaft having first and second intermediate gears mounted thereon, said first intermediate gear being in mesh with said input pinion gear and said second intermediate gear being in mesh with said final drive gear;

a planetary reduction gear group having a sun gear, a plurality of planet gears, a carrier and a ring gear, said sun gear being fixedly mounted on said sun gear shaft, said ring gear being radially and axially fixed to said housing, said planet gears being rotatably mounted on said carrier, said carrier being rotatably mounted on only said sun gear shaft, a bearing means mounted between said carrier and said hollow sun gear shaft restricting axial play and preventing radial play;

a sprocket rotatably mounted on said housing;

hollow torque tube means fixedly secured to said sprocket and rotatably mounted only on said sun gear shaft, said hollow torque tube means having a center portion open to said open center portion of said sun gear shaft; and means for coupling said hollow torque tube means with said carrier in such a manner as to allow slight play in axial and circumferential direction therebetween.

2. A final drive assembly as recited in claim 1 wherein said coupling means comprises splines formed on an inner face of said hollow carrier and an outer face of said torque tube means.

* * * * *